United States Patent
Kato et al.

(10) Patent No.: US 10,723,269 B2
(45) Date of Patent: Jul. 28, 2020

(54) MIRROR DEVICE FOR A VEHICLE

(71) Applicant: KABUSHIKI KAISHA TOKAI-RIKA-DENKI-SEISAKUSHO, Aichi-ken (JP)

(72) Inventors: Masami Kato, Aichi-ken (JP); Masakazu Iwatsuki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 150 days.

(21) Appl. No.: 15/824,529

(22) Filed: Nov. 28, 2017

(65) Prior Publication Data

US 2018/0154833 A1    Jun. 7, 2018

(30) Foreign Application Priority Data

Dec. 7, 2016   (JP) .................. 2016-237903

(51) Int. Cl.
*B60R 1/07*   (2006.01)
*B60R 1/00*   (2006.01)
*B60R 1/06*   (2006.01)

(52) U.S. Cl.
CPC ............ *B60R 1/07* (2013.01); *B60R 1/006* (2013.01); *B60R 1/06* (2013.01)

(58) Field of Classification Search
CPC ............. B60R 1/07; B60R 1/06; B60R 1/006
USPC ................. 359/871, 841, 844, 872
See application file for complete search history.

(56) References Cited

U.S. PATENT DOCUMENTS

2001/0030819 A1*  10/2001  Hattori ............. B60R 1/06
                                                    359/879

FOREIGN PATENT DOCUMENTS

| JP | S63-6953U U | 1/1988 |
| JP | 2012-86318 A | 5/2012 |
| JP | 2013-116683 | 6/2013 |
| JP | 2014-015071 A | 1/2014 |
| JP | 2015-016730 A | 1/2015 |

OTHER PUBLICATIONS

Office Action issued in the corresponding JP Application No. 2016-237903 dated Feb. 27, 2018.
Extended European Search Report issued in the corresponding EP Application No. 17204862.1 dated Feb. 27, 2018.

* cited by examiner

*Primary Examiner* — Jade R Chwasz
(74) *Attorney, Agent, or Firm* — Roberts Calderon Safran & Cole P.C.

(57) ABSTRACT

There is provided a mirror device for a vehicle, including: a support body that is fixed to a vehicle body side and supports a mirror of the vehicle; and a covering body that covers an outer periphery of the support body, wherein the covering body includes: a first covering body, mounting of which to the support body by a linear movement is constrained, the mounting of the first covering body to the support body including turning of the first covering body relative to the support body, and a second covering body that is combined with the first covering body.

8 Claims, 9 Drawing Sheets

MIRROR DEVICE FOR A VEHICLE

CROSS-REFERENCE TO RELATED APPLICATION

This application is based on and claims priority under 35 USC 119 from Japanese Patent Application No. 2016-237903 filed on Dec. 7, 2016, the disclosure of which is incorporated by reference herein.

BACKGROUND

Technical Field

The present disclosure relates to a mirror device for a vehicle, in which a support body supports a mirror of the vehicle.

Related Art

In a mirror device for a vehicle, a base that serves as a support body is fixed to a vehicle body and the base supports a mirror assembly. An outer periphery of the base is covered by a base cover; the base cover structures design surfaces of the mirror device for a vehicle. For example, in a mirror device for a vehicle recited in Japanese Patent Application Laid-Open (JP-A) No. 2015-16730, a base cover substantially in a curved tube shape covers a base. This base cover is formed by assembling an upper cover together with a lower cover. Division positions of this base cover are determined with consideration to requirements such as ease of mold release when the cover is molded, assembly characteristics, appearance and so forth.

If this base cover is moved linearly from one direction to be assembled to the base, there may be interference between the base cover and the base, depending on the division positions of the base cover.

Therefore, there may be limitations to the division positions of the base cover.

SUMMARY

In consideration of the circumstances described above, the present disclosure provides a mirror device for a vehicle that may improve a degree of freedom of division positions of a covering body.

A mirror device for a vehicle according to a first aspect of the present disclosure includes: a support body that is fixed to a vehicle body side and supports a mirror of the vehicle; and a covering body that covers an outer periphery of the support body, wherein the covering body includes: a first covering body, mounting of which to the support body by a linear movement is constrained, the mounting of the first covering body to the support body including turning of the first covering body relative to the support body; and a second covering body that is combined with the first covering body.

In a mirror device for a vehicle according to a second aspect of the present disclosure, in the first aspect, the combining of the second covering body with the first covering body includes turning of the second covering body relative to the support body.

A mirror device for a vehicle according to a third aspect of the present disclosure, in the first aspect or the second aspect, further includes a pawl portion provided at the covering body, the pawl portion displacing in an intersecting direction relative to an outer periphery face of the covering body for mounting to the support body.

In the mirror device for a vehicle according to the first aspect of the present disclosure, the support body is fixed to the vehicle body side, and the support body supports the mirror of the vehicle. The support body is covered by the covering member, which is the combination of the first covering body with the second covering body.

Mounting of the first covering body structuring the covering body by a linear movement relative to the support body is constrained; the first covering body is mounted to the support body by being turned relative to the support body. Therefore, the first covering body may be mounted to the support body even though the first covering body interferes with the support body if the first covering body is moved linearly toward the support body. Thus, a degree of freedom of division positions of the covering body may be improved.

In the mirror device for a vehicle according to the second aspect of the present disclosure, the second covering body that is to be combined with the first covering body is attached by being turned relative to the support body. Therefore, the second covering body may be combined with the first covering body with ease.

In the mirror device for a vehicle according to the third aspect of the present disclosure, the pawl portion is included, which is provided at the covering body and is displaced in a direction intersecting with the outer periphery face of the covering body to be mounted to the support body. Therefore, assembly characteristics of the covering body may be assured.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1A:
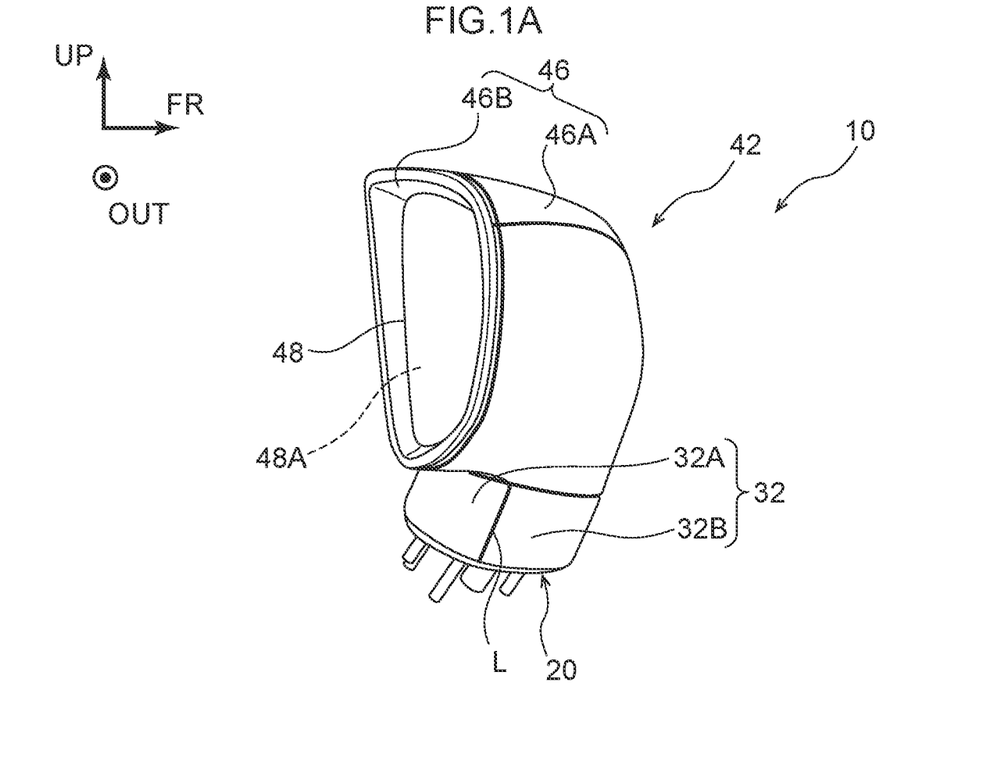
FIG. 1A is a diagram showing the exterior of a vehicle door mirror device according to a first exemplary embodiment, which is a side view seen from a vehicle width direction outer side (a vehicle right side)
Figure 1B:
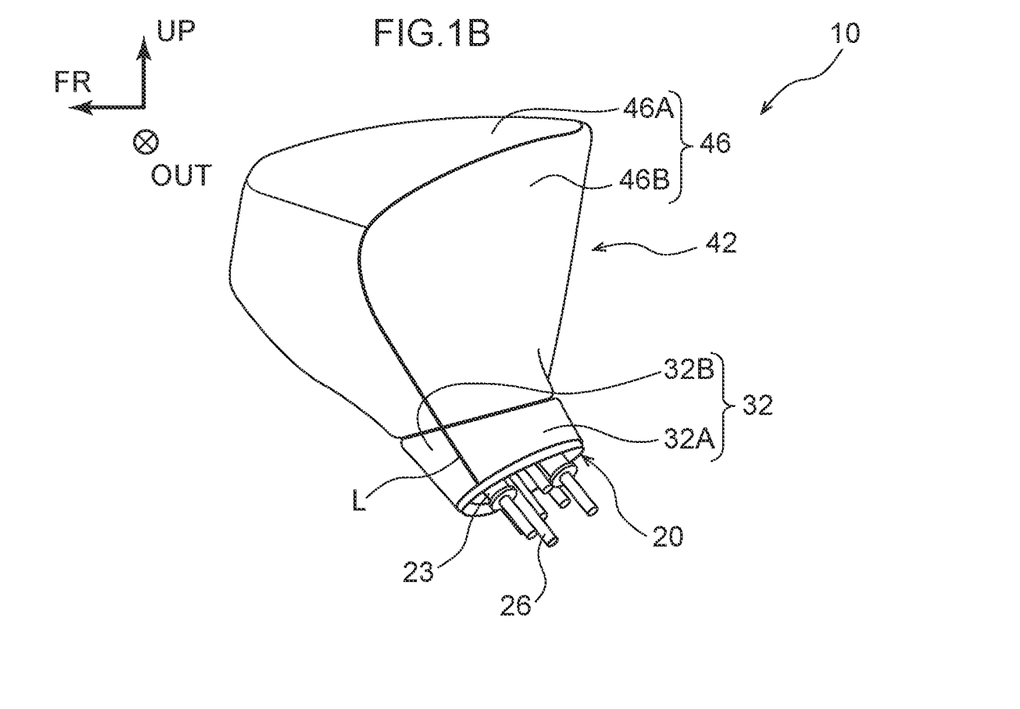
FIG. 1B is a diagram showing the exterior of the vehicle door mirror device according to the first exemplary embodiment, which is a side view seen from the vehicle width direction inner side (the vehicle left side)

FIG. 1A and FIG. 1B show a vehicle door mirror device 10 according to an exemplary embodiment in which the mirror device for a vehicle of the present disclosure is applied, in a side view (FIG. 1A) seen from a vehicle width direction outer side (vehicle right side) and in a side view (FIG. 1B) seen from the vehicle width direction inner side (the vehicle left side). In the drawings, the vehicle front is indicated by arrow FR, the vehicle width direction outer side (the vehicle right) is indicated by arrow OUT, and the upper side is indicated by arrow UP.

The vehicle door mirror device 10 according to the first exemplary embodiment is assembled to a side door (not shown in the drawings) corresponding to the vehicle body side of the vehicle and is disposed at the exterior of the vehicle. As shown in FIG. 1A and FIG. 1B, the vehicle door mirror device 10 according to the present exemplary embodiment includes a base 20 that is fixed to the side door and a mirror body 42 that is supported at the base 20.

As shown in FIG. 1A, the mirror body 42 includes a folding device 44, a visor 46 and a mirror 48. The visor 46 is an exterior member accommodating the mirror 48 and the folding device 44. The visor 46 constitutes design surfaces of the vehicle door mirror device 10.

The folding device 44 is accommodated inside the visor 46 and supports the visor 46 and the mirror 48. The visor 46 projects to the vehicle width direction outer side relative to the folding device 44. A vehicle front side portion of the visor 46 is structured by a visor cover 46A in a substantial dish shape, and a vehicle rear side portion of the visor 46 is structured by a visor body 46B that includes a wall face at the vehicle width direction inner side thereof (see FIG. 1B). That is, the visor 46 is structured by the combination of the visor cover 46A with the visor body 46B. The mirror 48 is provided so as to cover an aperture at the vehicle rear side of the visor 46. A mirror surface 48A of the mirror 48 faces to the vehicle rear side. Thus, a vehicle occupant may see to the vehicle rear with the mirror 48.

The vehicle door mirror device 10 is provided with the base 20 in a block shape fabricated of metal, which is a support body. As shown in FIG. 1B, a plural number (three in the present exemplary embodiment) of bosses 23 with circular tube shapes are formed at a lower end portion of the base 20. The bosses 23 protrude downward from the vehicle width direction inner side of the base 20. A bolt 26 is provided at the center of each boss 23. The bosses 23 and bolts 26 penetrate through assembly holes (not shown in the drawings) formed in a door panel of the side door. Nuts, which are not shown in the drawings, are screwed onto the bolts 26 from the vehicle width direction inner side of the door panel. Thus, the door panel is sandwiched by the nuts and the bosses 23, and the vehicle door mirror device 10 is fixed to the side door.

An outer periphery portion of the base 20 is covered by a base cover 32, which is a covering member in a substantially tubular shape fabricated of resin. The base cover 32 also constitutes design surfaces of the vehicle door mirror device 10. The base cover 32 is structured by a first base cover 32A (a first covering body), which structures the vehicle rear side of the base cover 32, and a second base cover 32B (a second covering body), which structures the vehicle front side of the base cover 32.

The vehicle door mirror device 10 according to the present exemplary embodiment is colored in two colors. To be specific, the visor cover 46A and second base cover 32B at the vehicle front side are colored the same color as the vehicle, and the visor body 46B and first base cover 32A at the vehicle rear side are colored black. In the vehicle door mirror device 10 that is colored thus, as shown in FIG. 1B, a division line L (division positions), which is a boundary between the colors extending from the base cover 32 to the visor 46, is formed as a continuous line.

Figure 2:
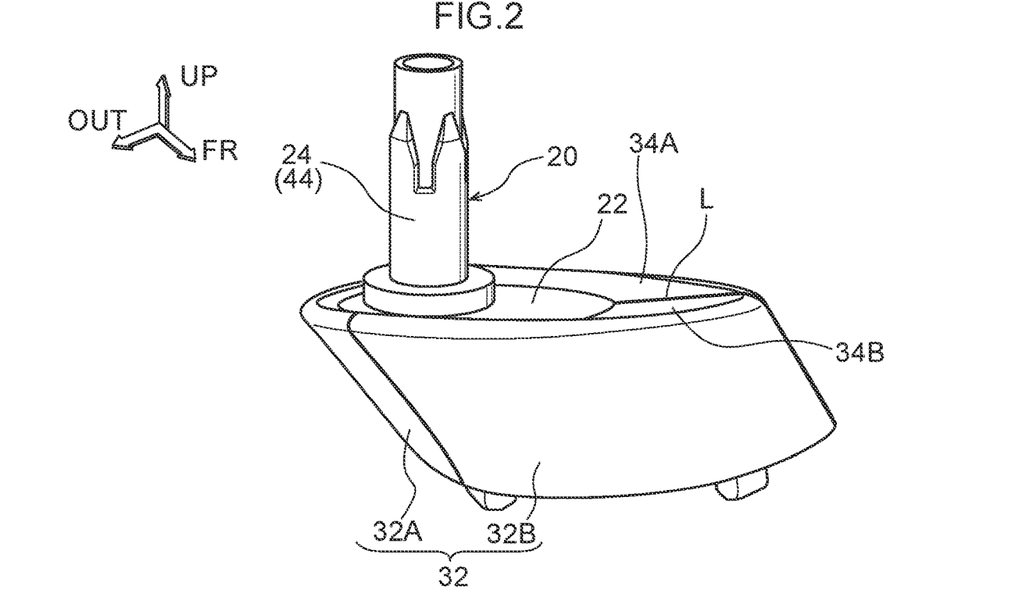
FIG. 2 is a diagram showing the exterior of a base of the vehicle door mirror device according to the first exemplary embodiment, which is a perspective view seen from the vehicle width direction outer side and vehicle front side.

FIG. 2 is a diagram showing a state in which the mirror body 42 is removed from the vehicle door mirror device 10 shown in FIG. 1A and FIG. 1B.

The base 20 is provided with a main body portion 21, a flat plate-shaped upper wall portion 22, and a circular rod-shaped stand 24. The upper wall portion 22 covers an upper end of the main body portion 21, and the stand 24 is provided standing from the upper wall portion 22. The main body portion 21 is a mounting portion for when the base 20 is being mounted to the vehicle body. The main body portion 21 is structured to serve as a support portion of the mirror body 42. A first protrusion portion 28A and a second protrusion portion 28B are provided standing from a vehicle width direction inner side of a floor portion of the main body portion 21 (see FIG. 4A). A first engaging pawl 54A, which is described below, is anchored at the first protrusion portion 28A, and a second engaging pawl 54B, which is described below, is anchored at the second protrusion portion 28B.

The upper wall portion 22 forms a common surface together with upper face portions of the base cover 32 (ceiling portions 34A and 34B). This surface is an opposing surface that opposes the visor 46. As shown in FIG. 4A, a groove portion 22A is formed in an outer periphery face of the upper wall portion 22. The groove portion 22A is a portion at which a collar portion 33A (see FIG. 3 and FIG.

Figure 7A:
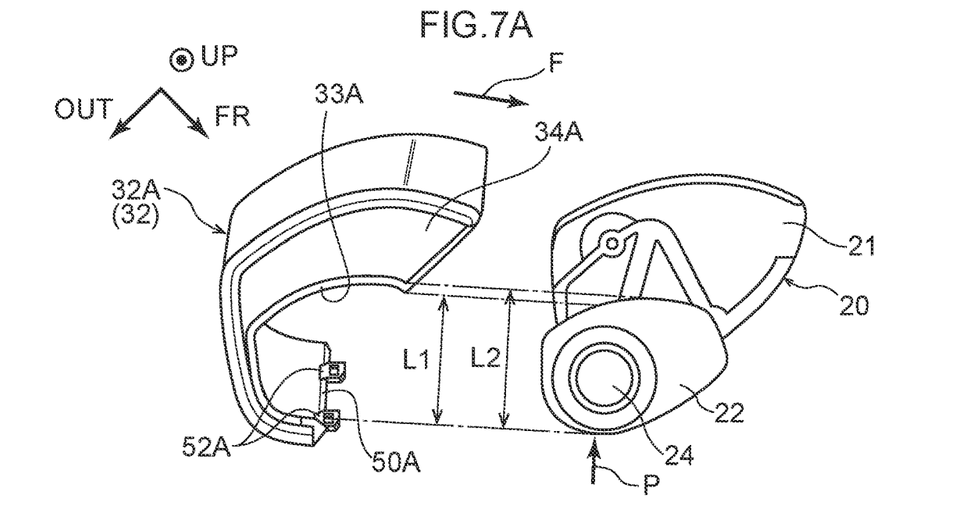
FIG. 7A to FIG. 7C are plan views describing a process of mounting the first base cover to the base of the vehicle door mirror device according to the first exemplary embodiment.

7A) and a collar portion 33B (see FIG. 3 and FIG. 8A) are inserted. The collar portion 33A is provided at an aperture at an upper portion of the first base cover 32A, which is described below. The collar portion 33B is provided at an aperture at an upper portion of the second base cover 32B, which is described below.

The stand 24 is a circular rod member fabricated of metal. The stand 24 is a structural element of the folding device 44, and functions as a support shaft when the mirror body 42 is being turned. The mirror body 42 according to the present exemplary embodiment is configured to be turnable electrically or manually. When the mirror body 42 is turned electrically, the mirror body 42 is turned by the folding device 44 toward the vehicle rear side and the vehicle width direction inner side and is folded (folded rearward). The mirror body 42 is also turned by the folding device 44 toward the vehicle front side and the vehicle width direction outer side and extended (unfolded/returned).

As shown in FIG. 7A, the first base cover 32A is a member fabricated of resin with a substantial "C" shape in a plan view. The first base cover 32A is provided with the ceiling portion 34A, which covers an upper portion at the vehicle rear side of the base 20, and an opening portion 50A, which is open to the vehicle front side.

As shown in FIG. 4A, the first base cover 32A is provided with a pair of first engaging portions 52A at the vehicle width direction outer side of the opening portion 50A and a pair of second engaging portions 52B at the vehicle width direction inner side of the opening portion 50A. Each first engaging portion 52A is a pawl in a substantially rectangular plate shape, which is formed to protrude toward the vehicle front along an inner wall of the first base cover 32A. A substantially rectangular hole penetrating through the thickness direction of the first engaging portion 52A is formed at a substantial width direction middle of the first engaging portion 52A, at a substantial length direction middle of the first engaging portion 52A. Each second engaging portion 52B is a pawl in a substantially rectangular plate shape, which is formed to protrude toward the vehicle front along an inner wall of the first base cover 32A. A substantially rectangular hole penetrating through the thickness direction of the second engaging portion 52B is formed at a substantial width direction middle of the second engaging portion 52B, at a substantial length direction middle of the second engaging portion 52B.

Figure 4A:
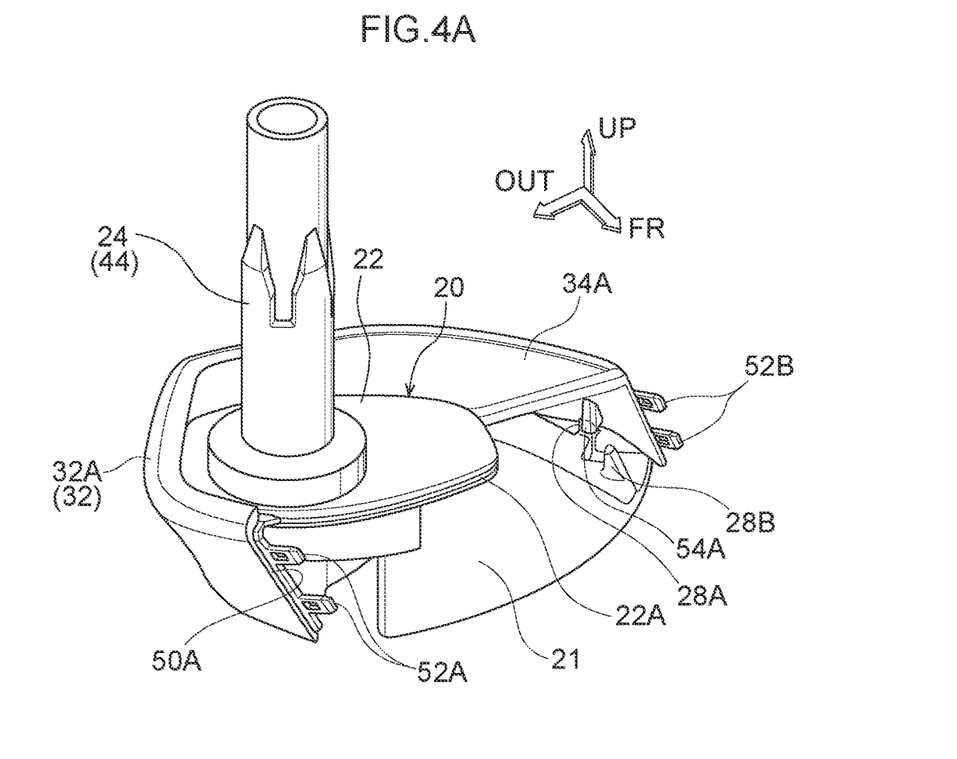
FIG. 4A is a diagram showing a state in which the first base cover has been mounted to the base of the vehicle door mirror device according to the first exemplary embodiment, which is a perspective view seen from the vehicle width direction outer side and vehicle front side.
Figure 4B:
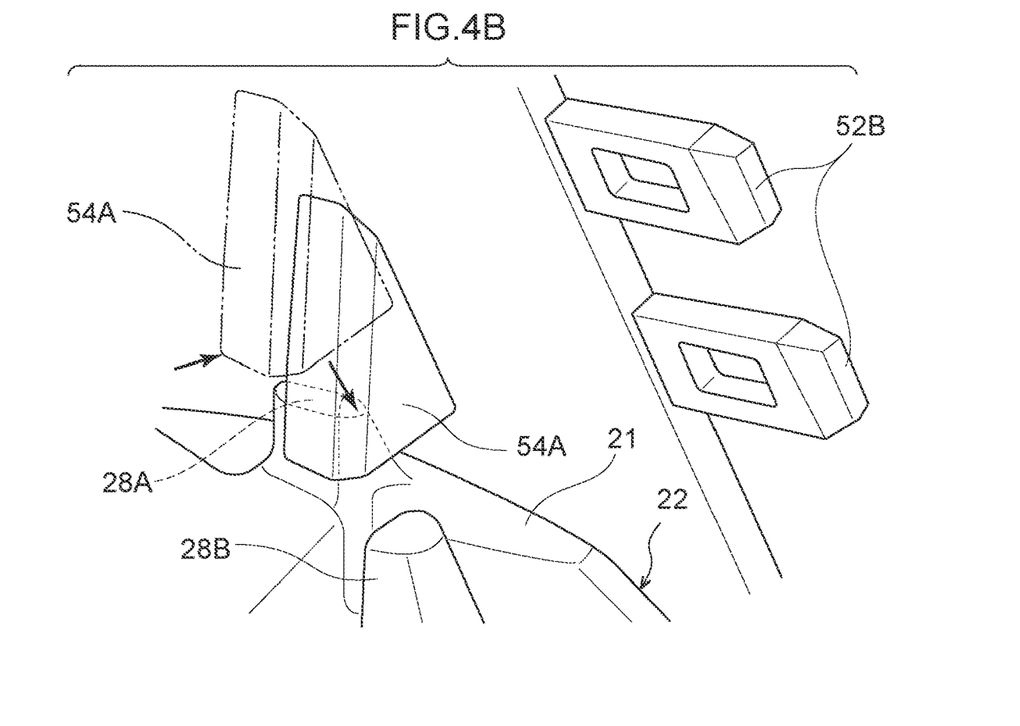
FIG. 4B is a diagram showing the state in which the first base cover has been mounted to the base of the vehicle door mirror device according to the first exemplary embodiment, which is a magnified view of a vicinity of a first engaging pawl.

The first base cover 32A is further provided with the first engaging pawl 54A at the vehicle rear side relative to the second engaging portions 52B. As shown in FIG. 4B, the first engaging pawl 54A is a pawl with an "L" shape in cross section, which is formed to extend downward from the inner wall of the first base cover 32A. The first base cover 32A is mounted to the base 20 by the first engaging pawl 54A being anchored at the first protrusion portion 28A that is provided standing from the floor portion of the base 20.

Figure 8A:
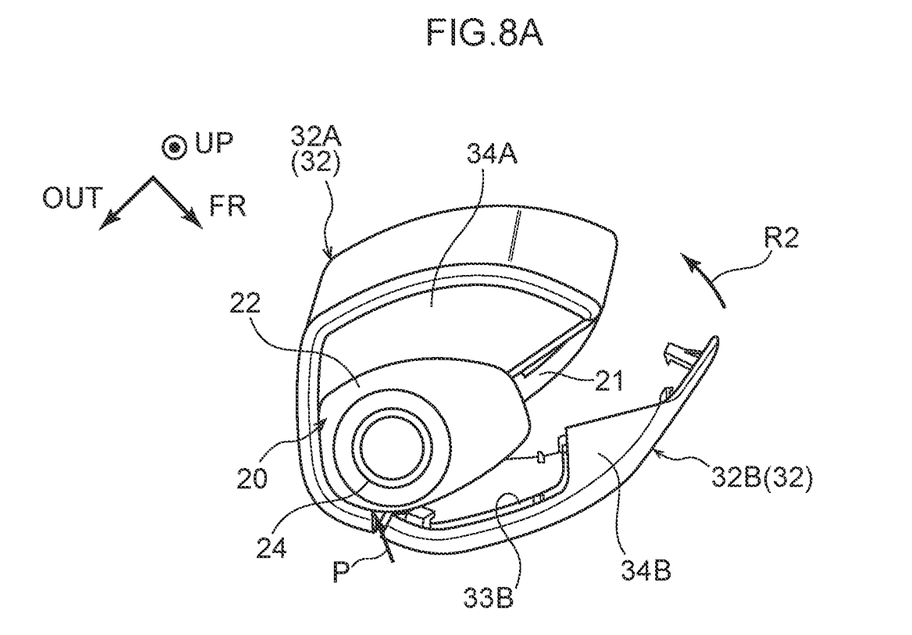
FIG. 8A and FIG. 8B are plan views describing a process of mounting the second base cover to the base of the vehicle door mirror device according to the first exemplary embodiment.

As shown in FIG. 8A, the second base cover 32B is a member fabricated of resin with a curved plate shape in plan view. The second base cover 32B is provided with the ceiling portion 34B, which covers an upper portion at the vehicle width direction inner side of the base 20.

Figure 3:
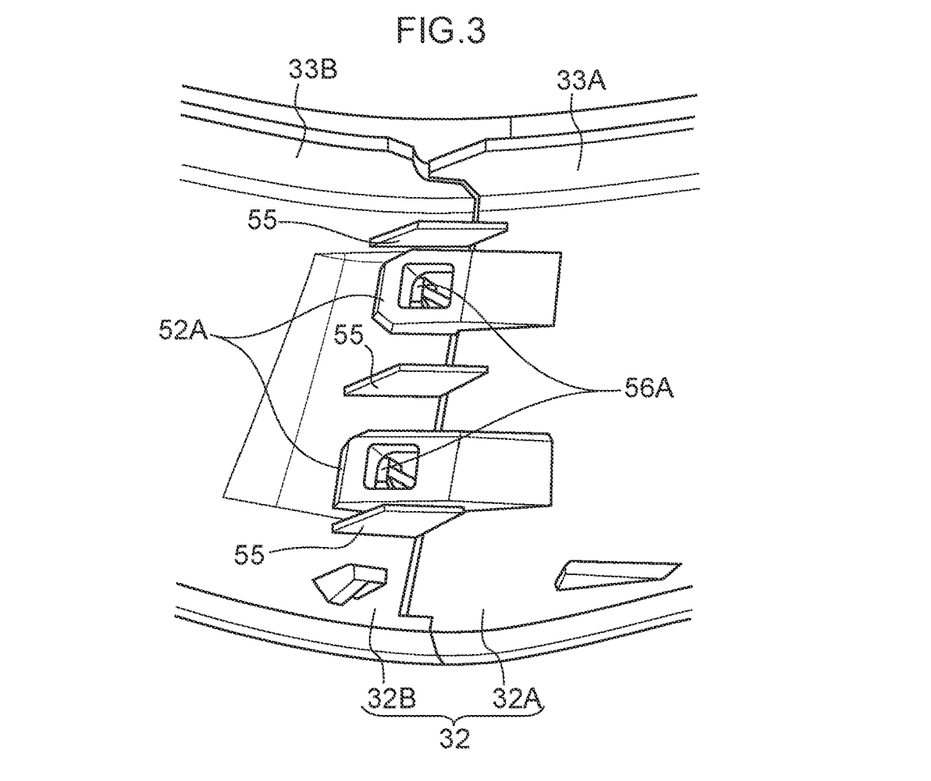
FIG. 3 is a diagram showing an engaged state, at the vehicle width direction outer side, between a first base cover and a second base cover of the vehicle door mirror device according to the first exemplary embodiment, which is a perspective diagram with a viewpoint at the inside of the base covers.

As shown in FIG. 3, three ribs 55 are formed at the second base cover 32B along an end portion at the vehicle width direction outer side thereof. A pair of first projecting portions 56A are formed in regions sandwiched by the ribs 55. Each rib 55 is provided standing from the inner wall of the second base cover 32B and projects toward the side thereof at which the first base cover 32A is to be disposed. Each first projecting portion 56A projects from the inner wall of the second base cover 32B. The first projecting portion 56A includes an inclined surface that forms a downward slope at the side thereof at which the first base cover 32A is disposed. The first projecting portion 56A also includes a wall surface orthogonal to the inner wall face of the second base cover 32B at the opposite side of the first projecting portion 56A from the side at which the inclined surface is provided.

Figure 5A:
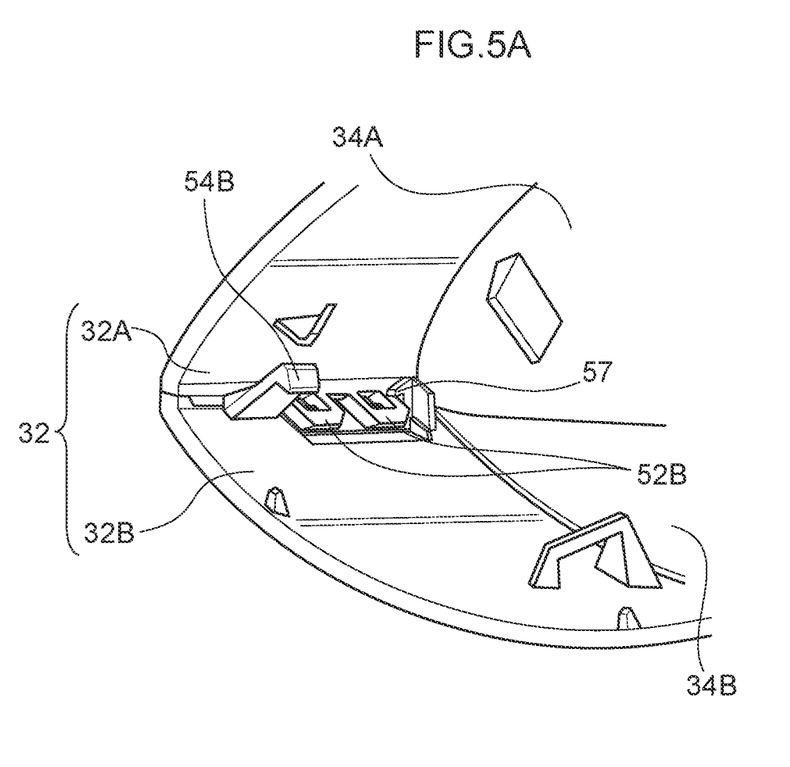
FIG. 5A is a diagram showing an engaged state, at the vehicle width direction inner side, between the first base cover and the second base cover of the vehicle door mirror device according to the first exemplary embodiment, which is a perspective diagram with a viewpoint at the inside of the base covers.
Figure 5B:
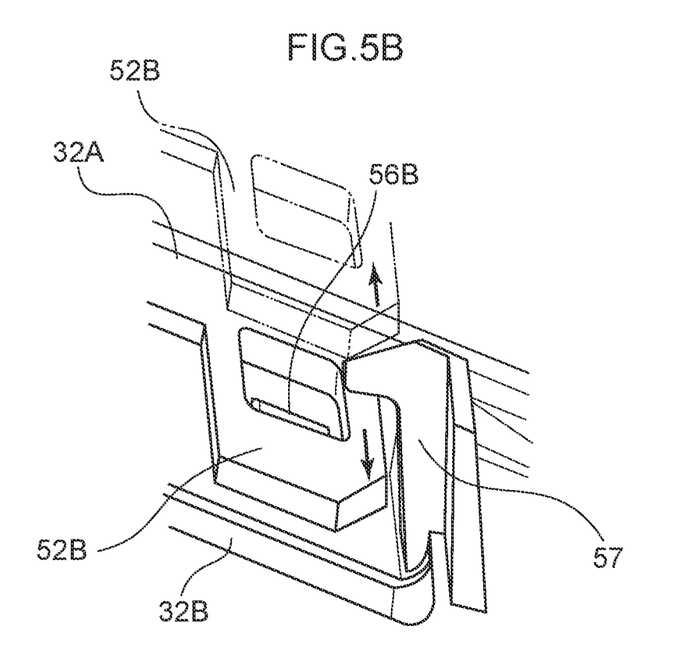
FIG. 5B is a diagram showing the engaged state at the vehicle width direction inner side between the first base cover and the second base cover of the vehicle door mirror device according to the first exemplary embodiment, which is a magnified view of a vicinity of an anchoring pawl.

The second base cover 32B is further provided with a pair of second projecting portions 56B in the vicinity of an end portion at the vehicle width direction inner side of the second base cover 32B (see FIG. 5B). Each second projecting portion 56B projects from the inner wall of the second base cover 32B. Although not shown in the drawings, the second projecting portion 56B includes an inclined surface that forms a downward slope at the side thereof at which the first base cover 32A is disposed. The second projecting portion 56B also includes a wall surface orthogonal to the inner wall face of the second base cover 32B at the opposite side of the second projecting portion 56B from the side at which the inclined surface is provided.

As shown in FIG. 5A, the second base cover 32B is also provided with the second engaging pawl 54B and an anchoring pawl 57 at two end sides of the second projecting portions 56B. The second engaging pawl 54B is a hook-shaped pawl that is provided standing from the inner wall at an end portion of the second base cover 32B. A distal end of the second engaging pawl 54B protrudes from the opposite side thereof from a side that is disposed at the first base cover 32A. The anchoring pawl 57 is a hook-shaped pawl that is provided standing from the inner wall of the second base cover 32B at the side thereof at which the ceiling portion 34B is disposed. A distal end of the anchoring pawl 57 protrudes from the opposite side thereof from the side at which the second projecting portions 56B are disposed.

Figure 6:
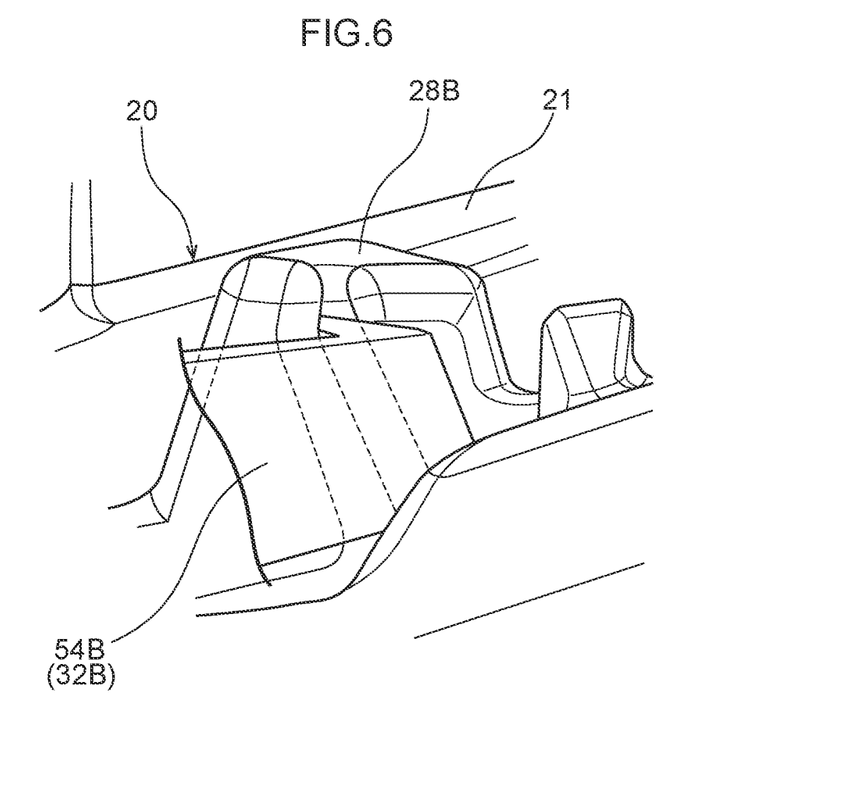
FIG. 6 is a perspective view showing an engaged state between a second engaging pawl and a second protrusion portion in the vehicle door mirror device according to the first exemplary embodiment.

The base cover 32 according to the present exemplary embodiment that is structured as described above is mounted to the base 20 as follows. As shown in FIG. 4B, the first engaging pawl 54A is anchored at the first protrusion portion 28A; thus, the first base cover 32A is mounted to the base 20 at the vehicle width direction inner side. As shown in FIG. 3, the first projecting portions 56A are fitted into the rectangular holes formed in the first engaging portions 52A; thus, the first base cover 32A is combined with the second base cover 32B at the vehicle width direction outer side. As shown in FIG. 5A and FIG. 5B, the second projecting portions 56B are fitted into the rectangular holes formed in the second engaging portions 52B; thus, the first base cover 32A is combined with the second base cover 32B at the vehicle width direction inner side. As shown in FIG. 6, the second engaging pawl 54B is anchored at the second protrusion portion 28B provided standing from the floor portion of the base 20; thus, the second base cover 32B is mounted to the base 20 at the vehicle width direction inner side.

Now, operation of the first exemplary embodiment is described.

Although not specifically shown in the drawings, the visor 46 and the like structuring the mirror body 42 are mounted to the base 20 illustrated in FIG. 7A in advance. That is, the folding device 44, the visor 46 and the like are assembled to the base 20 in a state in which the base cover 32 has not been mounted to the base 20, after which the first base cover 32A and second base cover 32B of the base cover 32 are mounted to the base 20 in this order.

Figure 7B:
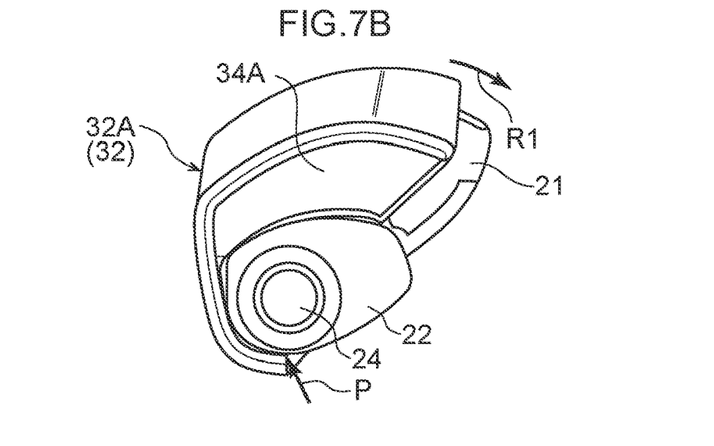
Figure 7C:
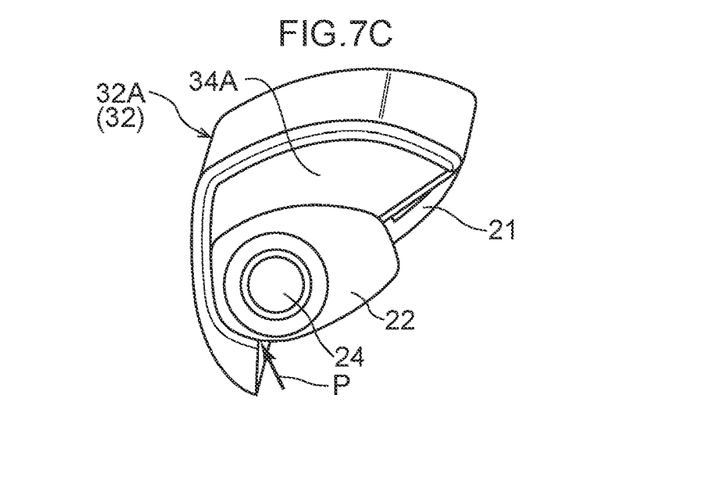

FIG. 7A to FIG. 7C are plan views showing a process of mounting the first base cover 32A to the base 20. As shown in FIG. 7A, a width L1 of the opening portion 50A of the first base cover 32A is smaller than a width L2 of the upper wall portion 22 at a location that corresponds with the first base cover 32A. Accordingly, from a state in which orientations are aligned for mounting and the first base cover 32A opposes the base 20, the opening portion 50A of the first base cover 32A is moved linearly toward the base 20 (see arrow F) and an end portion of the opening portion 50A interferes with the base 20 (the upper wall portion 22). That is, mounting by linear movement of the first base cover 32A is constrained in the present exemplary embodiment.

Hence, in the present exemplary embodiment, the first base cover 32A may be mounted to the base 20 by being turned along the outer periphery of the base 20.

As illustrated in FIG. 7A, when a portion of the outer periphery region of the upper wall portion 22 that is closest to the stand 24 reaches a position P, the first base cover 32A is mounted to the base 20 by being turned starting from the position P. To be specific, as illustrated in FIG. 7B, one end at the vehicle width direction outer side of the opening portion 50A is abutted against the position P and the other end at the vehicle width direction inner side of the opening portion 50A is turned toward the vehicle front (see arrow R1), such that the base 20 enters into the opening portion 50A. At this time, because the first base cover 32A is fabricated of resin and features resiliency, the opening portion 50A widens and the width L2 portion (see FIG. 7A) of the base 20 may pass through the opening portion 50A. The first engaging pawl 54A of the first base cover 32A rides over the first protrusion portion 28A of the base 20 and is anchored at the first protrusion portion 28A (see the two-dot chain lines in FIG. 4B). As a result, the first base cover 32A attains a mounted state in which the first base cover 32A is mounted to the base 20, as shown in FIG. 7C.

In the mounted state of the first base cover 32A, the collar portion 33A is inserted into the groove portion 22A. Therefore, movement of the first base cover 32A in the vehicle up-and-down direction is constrained (see FIG. 4A). Moreover, because the first engaging pawl 54A is anchored at the first protrusion portion 28A, turning of the first base cover 32A in the opposite direction to the direction of turning for mounting (the direction of arrow R1 in FIG. 7B) is constrained.

Figure 8B:
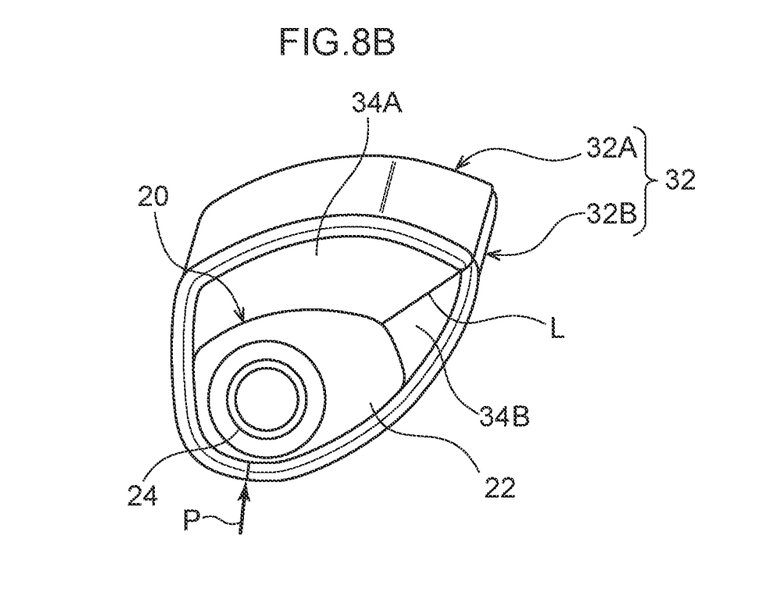

FIG. 8A and FIG. 8B are plan views showing a process of mounting the second base cover 32B to the base 20. In the present exemplary embodiment, the second base cover 32B may be mounted to the base 20 by being turned along the outer periphery of the base 20.

As shown in FIG. 8A, in the mounted state of the first base cover 32A, the one end at the vehicle width direction outer side of the opening portion 50A is disposed at the position P that was the start point when the first base cover 32A was being mounted to the base 20. The second base cover 32B is mounted to the base 20 by being turned starting from this position P.

To be specific, firstly, as illustrated in FIG. 8A, one end at the vehicle width direction outer side of the second base cover 32B is abutted against the position P. At this time, the end portion at the vehicle width direction outer side of the first base cover 32A (the opening portion 50A) is abutted against the end portion at the vehicle width direction outer side of the second base cover 32B. Then, an end portion at the vehicle width direction inner side of the second base cover 32B is turned toward the vehicle rear (see arrow R2) so as to cover an exposed region at the vehicle front side of the base 20. The second projecting portions 56B fit into the rectangular holes in the second engaging portions 52B (see FIG. 5B), and the second engaging pawl 54B is anchored at the second protrusion portion 28B (see FIG. 6). Thus, as shown in FIG. 8B, the second base cover 32B attains a mounted state in which the second base cover 32B is combined with the first base cover 32A and is mounted to the base 20. When the base cover 32 is in this mounted state, a state is attained in which the first projecting portions 56A are fitted into the rectangular holes in the first engaging portions 52A at the vehicle width direction outer side (see FIG. 3). In this state, the first engaging portions 52A are anchored at wall faces of the first projecting portions 56A. When the second projecting portions 56B are being fitted into the second engaging portions 52B, in association with the turning of the second base cover 32B, distal ends of the second engaging portions 52B ride over the inclined surfaces of the second projecting portions 56B and fit into the rectangular holes in the second engaging portions 52B (see the two-dot chain lines in FIG. 5B). As a result, the second engaging portions 52B are anchored at wall faces of the second projecting portions 56B.

In the mounted state of the second base cover 32B, the collar portion 33B is inserted into the groove portion 22A. Therefore, movement of the second base cover 32B in the vehicle up-and-down direction is constrained. Moreover, because the second engaging pawl 54B is anchored at the second protrusion portion 28B, turning of the second base cover 32B in the opposite direction to the direction of turning for mounting (see arrow R2 in FIG. 8A) is constrained.

As a result of the first base cover 32A and the second base cover 32B being combined, movement thereof relative to one another is constrained. To be specific, movement of the first base cover 32A toward the vehicle width direction outer side is constrained by the first engaging portion 52A, and movement of the second base cover 32B toward the vehicle width direction outer side is constrained by the ribs 55. Further, separation of the first base cover 32A from the second base cover 32B is prevented by the first engaging portions 52A being anchored at the first projecting portions 56A. Movement of the first base cover 32A toward the vehicle width direction inner side is constrained by the second engaging portion 52B, and movement of the second base cover 32B toward the vehicle width direction inner side is constrained by the anchoring pawl 57. Separation of the first base cover 32A from the second base cover 32B is further prevented by the second engaging portions 52B being anchored at the second projecting portions 56B.

In the first exemplary embodiment described above, the first base cover 32A and second base cover 32B structuring the base cover 32 are formed to be mountable to the base 20 by being turned along the outer periphery of the base 20. In particular, the opening portion 50A of the first base cover 32A is formed with a width so as to interfere with the base 20. Thus, the first base cover 32A cannot be mounted if moved linearly toward the base 20, but can be mounted by turning. Therefore, assembly characteristics are improved. As a result, from the state in which the base cover 32 has not been mounted to the base 20, the base cover 32 may be mounted from sideward after assembly of the folding device 44, the visor 46 and the like. That is, the base cover is not limited to structures in which the base cover covers a base from above; the base cover may be mounted from sideward.

Because assembly characteristics are improved, base covers with shapes that cannot be mounted by linear movement may be designed. That is, freedom of design may be improved. According to the present exemplary embodiment, a degree of freedom of division positions of the base cover 32 may also be improved. Therefore, when the vehicle door mirror device 10 is constituted with plural colors, the division line L may be provided in the base cover 32 along the boundary between the colors of the visor 46. Thus, a deterioration in appearance may be prevented.

As described above, turning of the first base cover 32A and the second base cover 32B in the opposite directions to the directions of turning for mounting is constrained. Furthermore, as a result of the first base cover 32A and second base cover 32B being combined, movements thereof relative to one another are constrained. Therefore, according to the present exemplary embodiment, disengagement of the first base cover 32A and/or the second base cover 32B from the base 20 during wiping in a vehicle wash is prevented.

Second Exemplary Embodiment

A second exemplary embodiment differs from the first exemplary embodiment in part of the method of mounting the first base cover 32A and second base cover 32B to the base 20. Differences from the first exemplary embodiment are described below. Structures that are the same as in the first exemplary embodiment are assigned the same reference symbols.

Figure 9A:
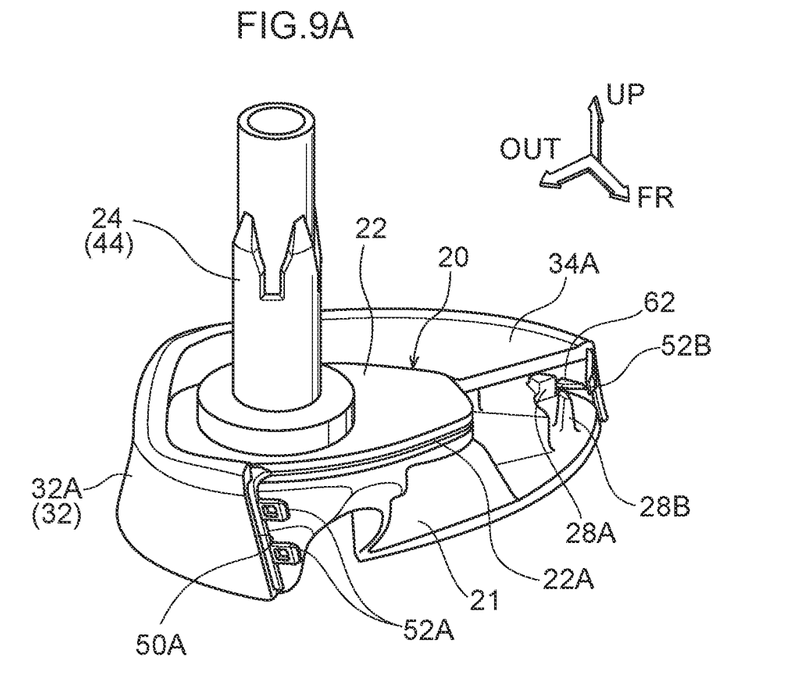
FIG. 9A is a diagram showing a state in which a first base cover has been mounted to a base of a vehicle door mirror device according to a second exemplary embodiment, which is a perspective view seen from the vehicle width direction outer side and vehicle front side.

As shown in FIG. 9A, the first base cover 32A is provided with one of the second engaging portion 52B at the vehicle width direction inner side. The shape of this first engaging portion 52A is the same as in the first exemplary embodiment.

Figure 9B:
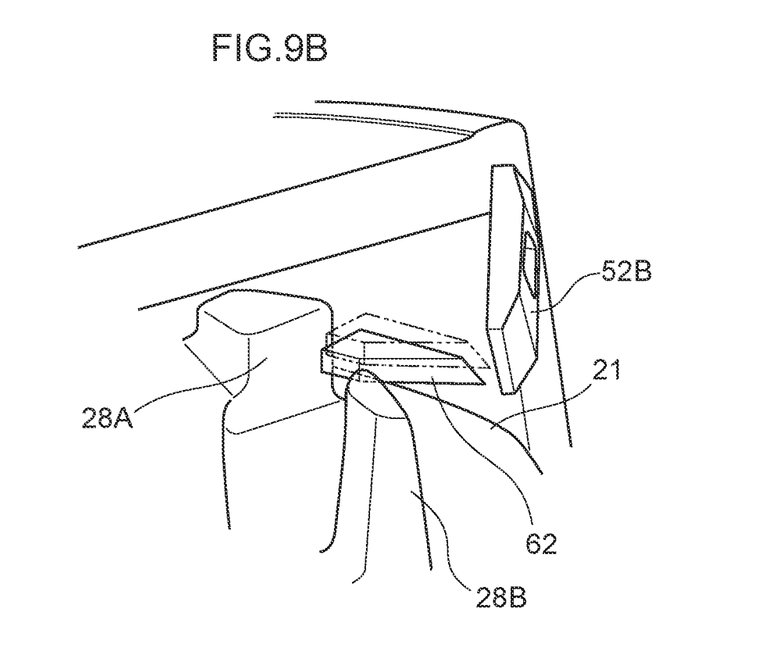
FIG. 9B is a diagram showing the state in which the first base cover has been mounted to the base of the vehicle door mirror device according to the second exemplary embodiment, which is a magnified view of a vicinity of an outer side engaging pawl.

In the first base cover 32A according to the second exemplary embodiment, an outer side engaging pawl 62 that serves as a pawl portion is formed instead of the first engaging pawl 54A of the first exemplary embodiment. To be specific, the first base cover 32A is provided with the outer side engaging pawl 62 at the vehicle rear side relative to the second engaging portion 52B. The outer side engaging pawl 62 is a pawl with a substantially trapezoid shape, which is provided standing toward the vehicle width direction outer side from the inner wall of the first base cover 32A. As shown in FIG. 9B, the outer side engaging pawl 62 includes an inclined surface that forms a downward slope toward the inner wall of the first base cover 32A at the side of the outer side engaging pawl 62 at which the second engaging portion 52B is disposed. The outer side engaging pawl 62 also includes a wall surface orthogonal to the inner wall face of the first base cover 32A at the opposite side of the outer side engaging pawl 62 from the side at which the inclined surface is provided. The outer side engaging pawl 62 is anchored at the first protrusion portion 28A provided standing from the floor portion of the main body portion 21. Thus, the first base cover 32A is mounted to the base 20.

Although not shown in the drawings, the second base cover 32B is provided with one of the second projecting portion 56B in the vicinity of the end portion at the vehicle width direction inner side of the second base cover 32B. The second projecting portion 56B projects from the inner wall of the second base cover 32B. The second projecting portion 56B includes an inclined surface at the side thereof at which the first base cover 32A is disposed. The second projecting portion 56B also includes a wall surface orthogonal to the inner wall face of the second base cover 32B at the opposite side of the second projecting portion 56B from the side at which the inclined surface is provided.

In the second base cover 32B according to the second exemplary embodiment, the anchoring pawl 57 is not formed as in the first exemplary embodiment.

Figure 10:
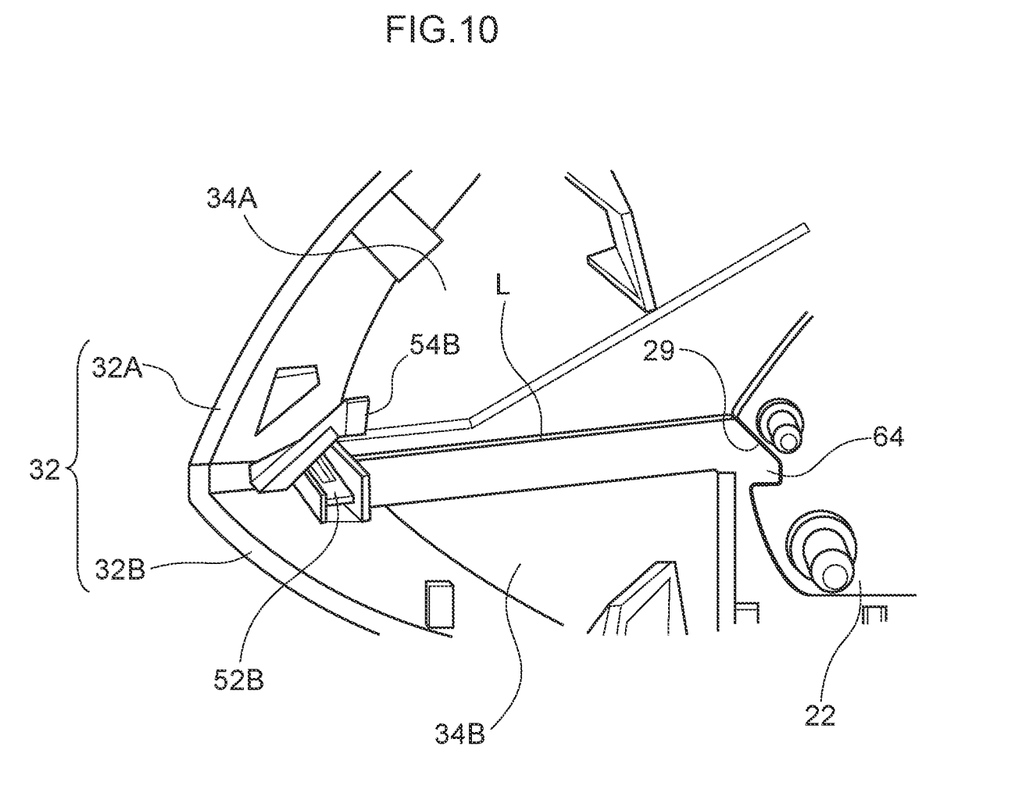
FIG. 10 is a diagram showing an engaged state, at the vehicle width direction inner side, between the first base cover and a second base cover of the vehicle door mirror device according to the second exemplary embodiment, which is a perspective diagram with a viewpoint at the inside of the base covers.

As shown in FIG. 10, an inner side engaging pawl 64 with a substantially trapezoid shape that serves as a pawl portion is formed at a corner portion of the ceiling portion 34B of the second base cover 32B at which the ceiling portion 34A and the upper wall portion 22 adjoin. The inner side engaging pawl 64 includes an inclined surface that is inclined in a direction away from the upper wall portion 22 toward the division line L. The inner side engaging pawl 64 also includes a wall surface oriented in the same direction as the division line L at the opposite side of the inner side engaging pawl 64 from the side at which the inclined surface is provided. A notch portion 29 with the same shape as the inner side engaging pawl 64 is formed at the upper wall portion 22 at a position corresponding with the inner side engaging pawl 64. The second base cover 32B is mounted to the base 20 by the inner side engaging pawl 64 being anchored at the notch portion 29.

Now, operation of the second exemplary embodiment is described.

In the second exemplary embodiment, the process of mounting the first base cover 32A and the second base cover 32B is similar to the first exemplary embodiment. That is, the first base cover 32A and the second base cover 32B are both mounted to the base 20 by being turned along the outer periphery of the base 20. The second exemplary embodiment is characterized by the outer side engaging pawl 62 and inner side engaging pawl 64, which are pawl portions for mounting the base cover 32 to the base 20, being displaced in directions intersecting the outer periphery face of the base cover 32. To be more specific, the outer side engaging pawl 62 is displaced in an intersecting direction relative to the outer periphery face of the first base cover 32A and the inner side engaging pawl 64 is displaced in an intersecting direction relative to the outer periphery face of the second base cover 32B.

Firstly in the process of mounting the first base cover 32A to the base 20, as illustrated in FIG. 7B, the one end at the vehicle width direction outer side of the opening portion 50A is abutted against the position P and the other end at the vehicle width direction inner side of the opening portion 50A is turned toward the vehicle front (see arrow R1). Then, as shown in FIG. 9B, when the inclined surface of the outer side engaging pawl 62 starts to abut against the first protrusion portion 28A, the outer side engaging pawl 62 starts to displace by bending to the outer side together with the first base cover 32A (see the two-dot chain lines in FIG. 9B). When the outer side engaging pawl 62 passes through the first protrusion portion 28A, the outer side engaging pawl 62 returns to its original position and the wall surface of the outer side engaging pawl 62 abuts against a side face of the first protrusion portion 28A. Thus, the mounted state is attained in which the first base cover 32A is mounted to the base 20.

In the process of mounting the second base cover 32B to the base 20, as shown in FIG. 8A, the one end at the vehicle width direction outer side of the second base cover 32B is abutted against the position P. Then the end portion at the vehicle width direction inner side of the second base cover 32B is turned toward the vehicle rear (see arrow R2). When the inclined surface of the inner side engaging pawl 64 comes into contact with the outer periphery face of the upper wall portion 22, the inner side engaging pawl 64 starts to displace by bending together with the second base cover 32B. The inner side engaging pawl 64 is anchored at the notch portion 29. Thus, the mounted state is attained in which the second base cover 32B is mounted to the base 20.

The second exemplary embodiment structured as described above provides, in addition to the same effects as the first exemplary embodiment, the following effects.

When the first base cover 32A and the second base cover 32B are being mounted, gaps of certain sizes must be provided between the respective members. If a gap between members is filled in, movement ranges of the members are reduced and mounting of the base cover 32 is more difficult. In particular, if the first base cover 32A or the second base cover 32B is moved up or down in the vehicle up-and-down direction while being mounted, a gap may be over-filled and it may not be possible to mount the first base cover 32A or second base cover 32B. In addition, there is a risk of a forcible attempt at mounting causing damage to a pawl component (the first engaging pawl 54A, the second engaging portion 52B, the anchoring pawl 57 or the like). However, in the second exemplary embodiment, because the outer side engaging pawl 62 and the inner side engaging pawl 64 displace in intersecting directions relative to the outer periphery face of the base cover 32, the first base cover 32A and second base cover 32B may be mounted to the base 20 without being moved up or down. Consequently, while the first base cover 32A and second base cover 32B are prevented from falling from the base 20, assembly characteristics may be improved and damage to the pawl components required for mounting (the first engaging pawl 54A, the second engaging portion 52B, the anchoring pawl 57 and the like) may be prevented.

The first and second exemplary embodiments are described above, but the exemplary embodiments encompass the following modes.

In the exemplary embodiments, both the first base cover 32A and the second base cover 32B are mounted to the base 20 by turning, but this is not limiting. That is, the first base cover 32A alone may be mounted by turning, with mounting by a linear movement being constrained, and the second base cover 32B that only covers the outer periphery of the base 20 may be mounted by a linear movement.

In the exemplary embodiments, the base cover 32 has a structure with two colors that is divided in two, but this is not limiting; structures are possible in which the base cover 32 is divided into three or more. In these cases, the base cover 32 may be colored with three or more colors that match up at division lines. Moreover, instead of simple coloring, a pattern such as a gradation, wood grain, metal texture, carbon texture or the like may be distributed over the base cover 32, the visor 46 and the like.

In the exemplary embodiments, the division line L is formed in a linear shape, but this is not limiting. Provided mounting by turning is possible, any shape is acceptable, such as lines including curved lines, steps and the like.

In the exemplary embodiments, the mirror device for a vehicle of the present disclosure is applied to the vehicle door mirror device 10. However, the mirror device for a vehicle of the present disclosure may be applied to alternative outer mirror devices for a vehicle at the vehicle exterior (for example, a vehicle fender mirror device) and to inner mirror devices for a vehicle at the vehicle interior.

What is claimed is:

1. A mirror device for a vehicle, comprising:
   a support body that is fixed to a vehicle body side and supports a mirror of the vehicle, and which includes an upper wall; and
   a covering body that has a substantially tubular shape, and that covers an outer periphery of the support body,
   wherein the covering body includes:
      a first covering body including an opening portion fittable around an outer edge of the upper wall of the support body, the mounting of which to the support body by a linear movement is constrained, and
      a second covering body that is combined with the first covering body,
   wherein the first covering body is configured to be attached to the support body by abutting an end of the opening portion against an edge of the upper wall of the support body and turning the first covering body around the support body until the outer edge of the upper wall is fitted into the opening portion.

2. The mirror device for a vehicle according to claim 1, wherein the combining of the second covering body with the first covering body includes turning of the second covering body relative to the support body.

3. The mirror device for a vehicle according to claim 1, further comprising a pawl portion provided at the covering body, the pawl portion displacing in an intersecting direction relative to an outer periphery face of the covering body for mounting to the support body.

4. The mirror device for a vehicle according to claim 3, wherein the pawl portion is a pawl with a substantially trapezoid shape.

5. The mirror device for a vehicle according to claim 4, wherein the pawl portion is provided standing from an inner wall of the first covering body.

6. The mirror device for a vehicle according to claim 1, wherein the support body is provided standing in an axial direction of a turning axis of the first covering body and comprises a protrusion portion at which one end of the first covering body, corresponding to the other end of the opening portion, is anchored.

7. The mirror device for a vehicle according to claim 1, wherein the covering body is made of resin.

8. The mirror device for a vehicle according to claim 1, wherein the covering body having a substantially tubular shape covers only the outer periphery of the support body, leaving a top and bottom portion of the support body exposed.

* * * * *